United States Patent Office 3,092,278
Patented June 4, 1963

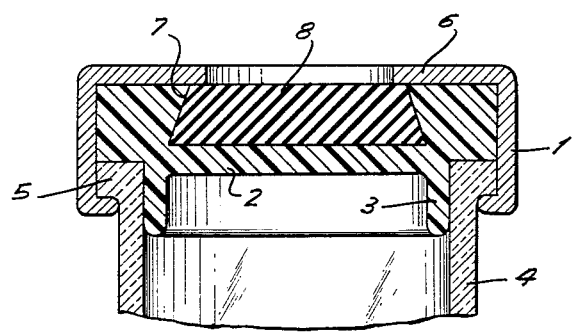

3,092,278
CAP FOR A CONTAINER FOR AN
INJECTION LIQUID
Bertil Järnhäll, Sodertalje, Sweden, assignor to Aktiebolaget Astra, Apotekarnes Kemiska Fabriker, Sodertalje, Sweden, a company of Sweden
Filed Sept. 19, 1958, Ser. No. 762,039
Claims priority, application Sweden Sept. 20, 1957
1 Claim. (Cl. 215—37)

The present invention relates to a sealing cap for containers filled with an injection liquid. A sealing cap of this type always contains a self-sealing material, usually rubber, so that the aperture produced when a cannula is thrust down through the cap for the purpose of sucking up liquid seals itself when the cannula is withdrawn.

However, sealing means hitherto known for the abovementioned purpose have the disadvantage that certain liquids are absorbed by the rubber in the sealing cap. Thorough investigations have shown that certain rubber components are dissolved by the liquid contained in the vessel so as to cause discoloration and other drawbacks, that might jeopardize the functional fitness of the product.

To avoid these disadvantages, it is known to make a sealing cap, the portion of which facing the container consists of a resistant plastic material, which is cemented by a self-tightening rubber plate to ensure effective sealing of the sealing cap after every puncture of the same. In practice, it has been found, however, that this cementation of rubber and plastic polymerisate is unsatisfactory, inasmuch as the cement is apt to become dissolved by moisture, for instance in connection with the sterilization performed prior to applying the sealing cap. The dissolution of the cement layer is believed to set in by the fact that liquid drops appearing on the cannula are brought into touch with the cement layer at every upward pull upon completed suction of the injection liquid.

It has also been attempted to make the sealing cap in its entirety from rubber, which brings about the abovementioned discoloration and possibly a destruction of the injection liquid through the dissolution of the rubber.

The abovementioned drawbacks are obviated through the present invention. The cap according to the invention comprises a plastic material member which is resistant to the injection liquid and which is arranged with one side thereof toward the mouth of the container, and is characterized by a self-sealing member being provided in a recess on the other side of the plastic member, the recess and the self-sealing member having a cross-sectional area which increases from the outer surface towards the interior in order to retain the self-sealing member in the plastic member.

The accompanying drawing illustrates an example of embodiment of the present invention, to which embodiment the invention is not restricted, however. The drawing shows the upper portion of a vessel, which is provided with a sealing cap according to the invention. The sealing cap consists of a lower member 2 of resistant plastic and merges at the lower end thereof into a lower member 3 shaped in the form of a cylindrical skirt and adapted at the closure of the container to be pressed into its mouth 4. Arranged in the upper portion of the member 2 is a recess 7, which is adapted to receive a plain rubber disk 8. Said rubber disk is preferably of a somewhat greater diameter than that of the recess. The recess and the disk are "undercut" at the circumference thereof, i.e. their cross-sectional area increases from the outer surface towards the interior, whereby the rubber disk is retained securely in the recess.

The entire closure is retained at the mouth 4 of the container by means of a cover 1, for instance one of metal, which encloses the edge of the member 2 and a bead 5 provided on the mouth of the container. The cover 1 is provided with an opening, through which a cannula is thrust down, when injection liquid is to be sucked up. This opening is preferably smaller than the rubber disk 8, so that the cover is caused to cover the edges of the disk, whereby a further warranty will be had against loosening of the disk.

When the plain rubber disk 2 is punctured by a cannula, outwardly directed compressive forces are obtained in the rubber disk, said forces insuring complete sealing of the rubber disk upon withdrawal of the cannula. From a sealing point of view it is preferred to make the self-sealing disk larger than the recess wherein it is arranged. As a matter of fact, the self-sealing disk will then be subjected in its mounted position to a pressure, which is directed from the edges inwardly toward the center. This pressure provides that the apertures formed by a cannula upon its withdrawal will be closed more effectively than would be the case with a self-sealing disk, which is not compressed in this way.

To retain disk 8, the "undercutting" of the edges of the disk and of the recess, as shown in the drawing, has an additional function. In fact, the "undercutting" or dovetailing has the effect that the edge of the recess presses the edge of the disk 8 inwardly, whereby a good contact surface is obtained between the bottom of the disk and the bottom of the recess. Hereby no injection liquid, that might possibly accompany the cannula while it is being withdrawn, is permitted to remain between the rubber disk and the plastic member, which might bring about an attack on the rubber disk. In order that this favourable effect shall be entirely accomplished, the disk 8 is preferably made somewhat larger than the recess.

The thickness of the material of the lower portion of the cap intended to be punctured should be relatively insignificant, since too thick a plastic portion would render the introduction of a cannula into the container difficult.

By the arrangement according to the present invention a sealing cap is provided, which in addition to an effective tightening effect prevents discoloration and destruction of the injection liquid. At the same time the sealing cap will be inexpensive to manufacture by the fact that the member consisting of plastic may be advantageously injection moulded at a small cost in machines intended for the purpose in view.

What is claimed is:

A cap for closing the mouth of a container for an injection liquid, which cap comprises a plastic material member which is resistant to the injection liquid and which is arranged for one side thereof to be placed within the mouth of the container to plug it closed; and which cap is characterized by having a recess in the outer face of said plastic material member, said recess having a substantially flat bottom and peripherally undercut sides; a self-sealing disc member provided in said recess, said self-sealing member being held positioned in said recess under compression and having its lower surface in compressed liquid tight face contact with the bottom of said recess; both of said members being puncturable by a cannula; and a retaining cover which is adapted to be secured about said cap and the neck of the container, and encloses the top and the outer peripheral wall of the cap, and is provided on its said top enclosing part with an opening through which a cannula can be thrust down into and through the cap, and characterized in that said opening in the cover is smaller than the top of the self-sealing member, so that said cover thus covers the peripheral top portion of the self-sealing member.

References Cited in the file of this patent

UNITED STATES PATENTS

| | | |
|---|---|---|
| 2,072,853 | Baxter | Mar. 9, 1937 |
| 2,698,272 | Clapp et al. | Dec. 28, 1954 |
| 2,742,170 | Bramming | Apr. 17, 1956 |
| 2,830,722 | Darmstadt | Apr. 15, 1958 |

FOREIGN PATENTS

| | | |
|---|---|---|
| 558,998 | Great Britain | Jan. 31, 1944 |
| 1,071,650 | France | Mar. 10, 1954 |